US007746765B2

(12) United States Patent
Lim et al.

(10) Patent No.: US 7,746,765 B2
(45) Date of Patent: Jun. 29, 2010

(54) METHOD AND SYSTEM FOR ALLOCATING DATA BURSTS IN A WIRELESS COMMUNICATION SYSTEM

(75) Inventors: Geun-Hwi Lim, Seongnam-si (KR); Jun-Hyung Kim, Suwon-si (KR); Hong-Sung Chang, Suwon-si (KR); Yong Chang, Seognam-si (KR)

(73) Assignee: Samsung Electronics Co., Ltd (KR)

( * ) Notice: Subject to any disclaimer, the term of this patent is extended or adjusted under 35 U.S.C. 154(b) by 1169 days.

(21) Appl. No.: 11/300,181

(22) Filed: Dec. 14, 2005

(65) Prior Publication Data

US 2006/0126553 A1 Jun. 15, 2006

(30) Foreign Application Priority Data

Dec. 14, 2004 (KR) .................. 10-2004-105898

(51) Int. Cl.
*H04J 11/00* (2006.01)
*H04B 7/216* (2006.01)

(52) U.S. Cl. ..................... 370/208; 370/329; 455/23

(58) Field of Classification Search ......... 370/204–208, 370/329; 455/23, 450, 452.1
See application file for complete search history.

(56) References Cited

U.S. PATENT DOCUMENTS

| 6,587,436 | B1 | 7/2003 | Vu et al. | |
| 6,657,949 | B1 | 12/2003 | Jones, IV et al. | |
| 6,693,983 | B1 | 2/2004 | Moher et al. | |
| 7,096,401 | B2* | 8/2006 | Cudak et al. | 714/751 |
| 7,165,204 | B2* | 1/2007 | Cudak et al. | 714/751 |
| 2002/0086707 | A1 | 7/2002 | Struhsaker et al. | |
| 2004/0042796 | A1 | 3/2004 | Con-Carolis et al. | |
| 2005/0201325 | A1 | 9/2005 | Kang et al. | |
| 2005/0286408 | A1* | 12/2005 | Jin et al. | 370/208 |
| 2007/0147384 | A1* | 6/2007 | Pekonen et al. | 370/394 |
| 2007/0286066 | A1* | 12/2007 | Zhang et al. | 370/208 |
| 2008/0112308 | A1* | 5/2008 | Cleveland | 370/204 |

FOREIGN PATENT DOCUMENTS

DE 10125728 11/2001
JP 2004-172900 6/2004

(Continued)

OTHER PUBLICATIONS

IEEE 802.16, Air Interface for Fixed Broadband Wireless Access Systems, Oct. 2004.

(Continued)

*Primary Examiner*—William Trost, IV
*Assistant Examiner*—Roberta A Shand
(74) *Attorney, Agent, or Firm*—The Farrell Law Firm, LLP

(57) ABSTRACT

A method and system for allocating data bursts in a wireless communication system. The system has a frame set by a symbol interval axis and a frequency band axis. The frame includes a first region in which a MAP message is transmitted and a second region to which the data bursts are allocated. A third region based on a symbol interval and a frequency band is set in the second region. The data bursts are sequentially allocated to the third region from a first symbol interval along the frequency band axis.

20 Claims, 2 Drawing Sheets

FOREIGN PATENT DOCUMENTS

| | | |
|---|---|---|
| KR | 1020030083549 | 10/2003 |
| KR | 1020040092535 | 11/2004 |
| KR | 1020050012947 | 2/2005 |
| KR | 1020050020747 | 3/2005 |
| KR | 10-2005-0091581 | 9/2005 |
| KR | 1020050096623 | 10/2005 |
| RU | 2 204 215 | 5/2000 |
| WO | WO 2004/012242 | 2/2004 |

OTHER PUBLICATIONS

Wonil Roh et al., IEEE 802.16, An Efficient AMC Zone Configuration Within HARQ for MIMO OFDMA, Nov. 14, 2004.

Hassan Yaghoobi, Scalable OFDMA Physical Layer in IEEE 802.16 WirelessMAN, Intel Technology Journal, Aug. 20, 2004.

Itzik Kitroser et al., "Additional Comments to P802.16d/D2", IEEE 802.16 Broadband Wireless Access Working Group, Jul. 16, 2003.

Yigal Leiba et al., "Generic H-ARQ Support", IEEE 802.16 Brodband Wireless Access Working Group, Nov. 4, 2004.

Tal Kaitz et al., "Time First vs. Frequency First Allocations in OFDMA Mode", Broadband Wireless Access Working Group, Jun. 26, 2004.

Chulsik Yoon et al., "Changes on Downlink and Uplink Resource Allocation in OFDMA-PHY", IEEE 802.16 Broadband Wireless Access Working Group, Jan. 27, 2004.

* cited by examiner

METHOD AND SYSTEM FOR ALLOCATING DATA BURSTS IN A WIRELESS COMMUNICATION SYSTEM

PRIORITY

This application claims priority under 35 U.S.C. §119 to an application entitled "Method and System for Allocating Data Bursts in a Wireless Communication System" filed in the Korean Intellectual Property Office on Dec. 14, 2004 and assigned Serial No. 2004-105898, the contents of which are incorporated herein by reference.

BACKGROUND OF THE INVENTION

1. Field of the Invention

The present invention generally relates to a wireless communication system, and more particularly to a method and system for allocating uplink and downlink data bursts in a wireless communication system.

2. Description of the Related Art

Extensive research is being conducted on fourth-generation (4G) communication systems serving as next generation communication systems that provide users with services based on various qualities of service (QoS) at a transmission rate of about 100 Mbps. In the current 4G communication system, extensive research is being conducted to ensure mobility and QoS and support high-speed services for broadband wireless access (BWA) communication systems such as a wireless local area network (LAN) system and a wireless metropolitan area network (MAN) system. A typical communication system is based on the Institute of Electrical and Electronics Engineers (IEEE) 802.16 communication system standard.

The IEEE 802.16 communication system is a BWA communication system using orthogonal frequency division multiplexing/orthogonal frequency division multiple access (OFDM/OFDMA). As compared with the conventional wireless technology for a voice service, the IEEE 802.16 communication system can transmit a large amount of data in a short time using a wide data bandwidth and can efficiently use a channel because the users can share a common channel. In the IEEE 802.16 communication system, all users associated with a base station (BS) share a common channel. Since the BS allocates an interval in which each user uses a channel for each uplink (UL) or downlink (DL) frame, the BS notifies the mobile stations of UL and DL access information so that the users can share the common channel. UL and DL MAP messages are used to supply the notification of the UL and DL access information.

A hybrid automatic repeat request (H-ARQ) MAP message is a type of MAP message used to support a mobile station (MS) available in an H-ARQ scheme. For example, the MS interprets an H-ARQ MAP message when receiving the message from the BS. A MAP information element (IE) included in the H-ARQ MAP message is referred to as a compact UL/DL_MAP IE. The MS can receive or transmit a data burst according to information of Compact UL/DL-MAP_IE.

FIG. 1 illustrates a frame structure used in a conventional wireless communication system.

Referring to FIG. 1, a frame can be divided into a DL subframe and a UL subframe.

The DL subframe includes a preamble transmission interval 10, a MAP transmission interval 20 and a data transmission interval 30.

The MAP transmission interval 20 includes a frame control header (FCH) 21 for transmitting information for decoding and demodulating MAP information and H-ARQ MAP1 22 and H-ARQ MAP2 23 for transmitting information to a desired MS. The data transmission interval 30 includes allocated data bursts to be transmitted to the MS using a plurality of subchannels in a specific symbol interval. Here, the data bursts are sequentially allocated in a subchannel unit of a vertical axis during a unit symbol interval of a horizontal axis. When data burst allocation is completed for all subchannels of one symbol interval, data bursts are sequentially allocated in the subchannel unit during the next symbol interval.

That is, Data Bursts 1, 2 and 3 of FIG. 1 are allocated in a specific symbol interval 'n'. For example, if Subchannels 0 to 5 are completely allocated for Data Burst 1, the BS allocates Data Burst 2 to Subchannels 6 to 8 and then allocates Data Burst 3 to Subchannels 9 to 10.

When the data burst allocation is completed in the 'n' symbol interval, the BS sequentially allocates Data Bursts 4 and 5 to subchannels in the next symbol interval, i.e., the 'n+1' symbol interval. The data burst allocation method as described above is referred to as "one-dimensional data burst allocation".

Next, the UL subframe will be described. The UL subframe includes a control information transmission interval 40 and a data transmission interval 50.

Data bursts for UL signal transmissions of MSs are allocated in one dimension in the data transmission interval 50 of the UL subframe as in the data transmission interval 30 of the DL subframe. That is, the end time of a previous data burst corresponds to the start time of the next allocated data burst.

When the BS (or higher-level stage) allocates data bursts in one dimension as described above, MAP overhead can be minimized. However, it is difficult for a specific data burst to be applied to a modulation and coding scheme. In other words, the modulation and coding scheme is applied in a symbol interval unit. The modulation and coding scheme cannot be applied when a specific data burst is allocated during two symbol intervals.

When the BS and a neighbor BS operate in an identical subchannel band, interference between the BSs results in data burst loss. Accordingly, data transmission efficiency is degraded.

SUMMARY OF THE INVENTION

It is, therefore, an object of the present invention to provide a method and system for efficiently allocating data bursts in a wireless communication system.

In accordance with an aspect of the present invention, there is provided a method for allocating data bursts in a wireless communication system, the wireless communication system having a frame set by a symbol interval axis and a frequency band axis, the frame including a first region in which a MAP message is transmitted and a second region to which the data bursts are allocated, the method including the steps of setting a third region based on a symbol interval and a frequency band in the second region, and sequentially allocating the data bursts to the third region from a first symbol interval along the frequency band axis.

In accordance with another aspect of the present invention, there is provided a system for allocating data bursts in a wireless communication system having a frame set by a symbol interval axis and a frequency band axis, the frame including a first region in which a MAP message is transmitted and a second region to which the data bursts are allocated, the system including a base station for setting a third region based on a symbol interval and a frequency band in the second region, and sequentially allocating the data bursts to the third region from a first symbol interval along the frequency band axis.

BRIEF DESCRIPTION OF THE DRAWINGS

The above and other objects and advantages of the present invention will be more clearly understood from the following detailed description taken in conjunction with the accompanying drawings, in which.

DETAILED DESCRIPTION OF THE PREFERRED EMBODIMENTS

Figure 1:
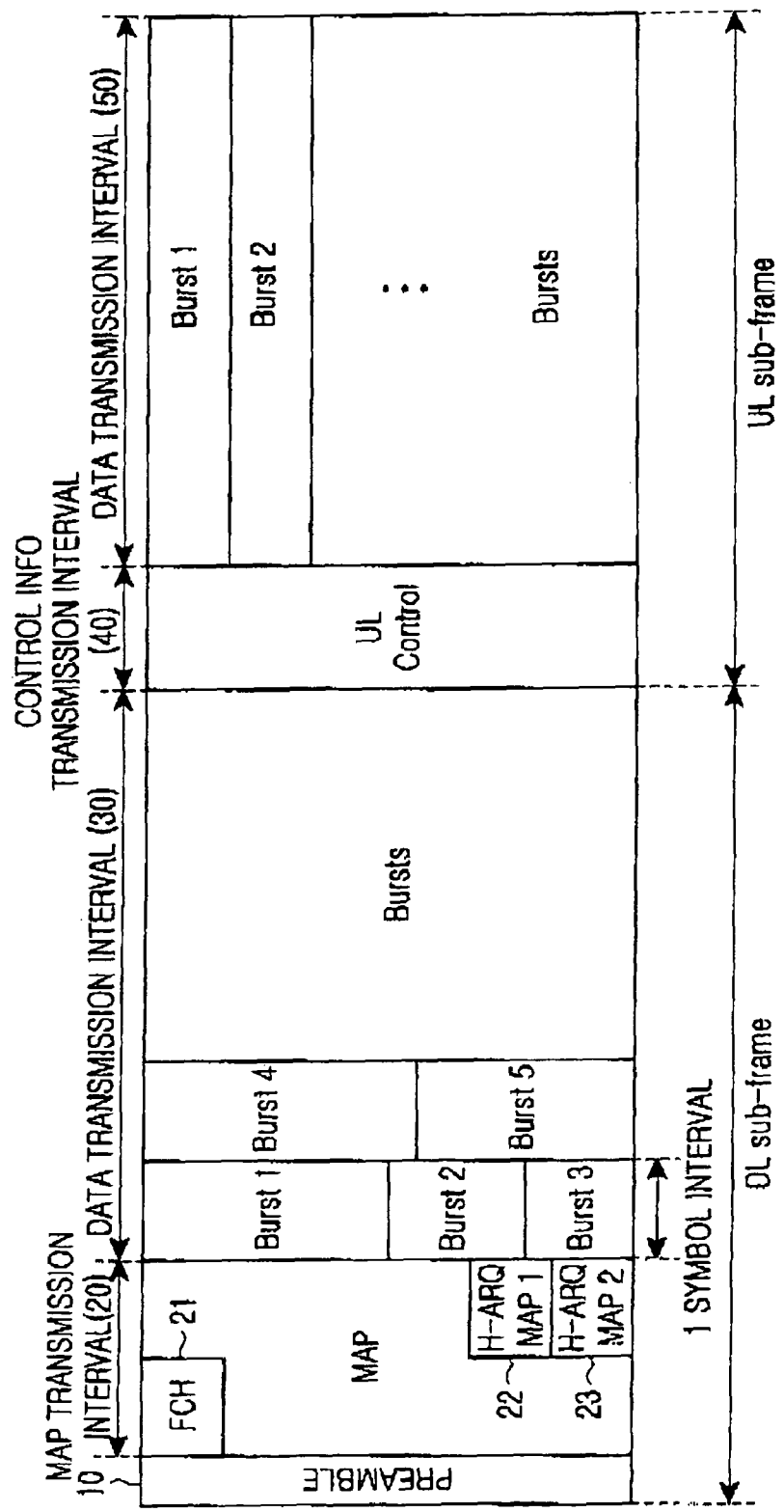
FIG. 1 illustrates a frame structure used in a conventional wireless communication system.

Preferred embodiments of the present invention will be described in detail herein below with reference to the accompanying drawings. In the drawings, the same or similar elements are denoted by the same reference numerals even though they are depicted in different drawings.

In the following description made in conjunction with preferred embodiments of the present invention, a variety of specific elements such as concrete messages and signals are shown. The description of such elements has been made only for a better understanding of the present invention. Those skilled in the art will appreciate that the present invention can be implemented without using the above-mentioned specific elements. In the following description, detailed descriptions of functions and configurations incorporated herein that are well known to those skilled in the art are omitted for the sake of clarity and conciseness.

The present invention proposes a method and system for setting a two-dimensional region to allocate uplink (UL) and downlink (DL) data bursts in a frame of a wireless communication system and allocating the data bursts of the set region in a single dimension. For example, a hybrid automatic repeat request (H-ARQ) MAP message will be described. The present invention can also use MAP messages such as DL-MAP and UL-MAP messages defined in the Institute of Electrical and Electronics Engineers (IEEE) 802.16 standard.

Figure 2:
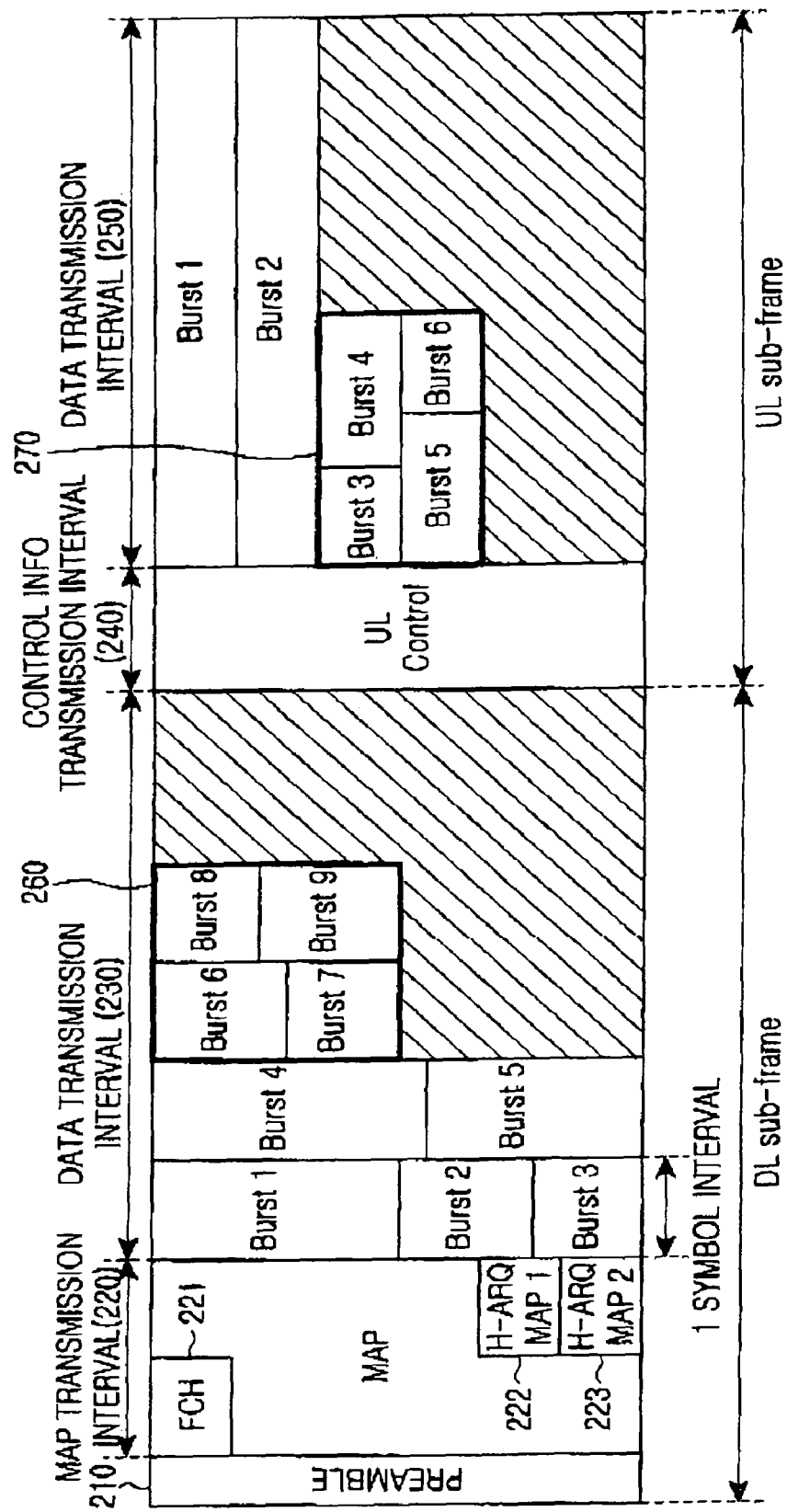
FIG. 2 illustrates a frame structure used in a wireless communication system in accordance with an embodiment of the present invention.

FIG. 2 illustrates a frame structure used in a wireless communication system in accordance with an embodiment of the present invention.

Referring to FIG. 2, a frame is configured by a DL subframe and a UL subframe. The DL subframe includes a preamble transmission interval 210, a MAP transmission interval 220 and a data transmission interval 230.

The UL subframe includes a control information transmission interval 240 and a data transmission interval 250.

Since the DL and UL subframes of FIG. 2 have structures similar to those of FIG. 1, a concrete description of the DL and UL subframes of FIG. 2 is omitted. In the frame, the horizontal axis represents symbol intervals and the vertical axis represents subframes. It is noted that data burst allocations in the data transmission interval 230 of the DL subframe and the data transmission interval 250 of the UL subframe in accordance with the present invention are different from the conventional one-dimensional data burst allocation. Specifically, a base station (BS) uses the conventional one-dimensional data burst allocation method for sequentially filling subchannels during one symbol interval and sequentially filling other subchannels during the next symbol interval. The present invention can use not only a data burst allocation method in one dimension, but also a new data burst allocation method in two dimensions.

The following is a description of a data burst allocation method based on the two-dimensional form.

Data Bursts 1, 2, 3, 4 and 5 are allocated to the data transmission interval 230 of the DL subframe of FIG. 2 as in the conventional one-dimensional burst allocation. A region 260 of Data Bursts 6, 7, 8 and 9 as indicated by the bold lines in the data transmission interval 230 of the DL subframe is allocated in the two-dimensional form. Similarly, a region 270 of Data Bursts 3, 4, 5 and 6 as indicated by the bold lines in the data transmission interval 250 of the UL subframe is allocated in the two-dimensional form.

The BS designates a start point using a symbol offset and a subchannel offset to designate the two-dimensional data burst regions 260 and 270 of the rectangle. A size of the two-dimensional data burst regions 260 and 270 is determined from the start point through the setting of the number of symbols and the number of subchannels. When a size of the two-dimensional data burst regions 260 and 270 is set, the BS allocates the data bursts to the set region in the one-dimensional form. This two-dimensional data burst allocation is advantageous in that the MAP overhead is reduced and the data transmission error is minimized, improving the overall system performance. Specifically, because the BS can allocate a subchannel band in the two-dimensional form different from that of a neighbor BS when allocating a data burst for a mobile station (MS) located in a handover region, the interference between subchannels can be avoided and the data transmission error can be minimized.

For example, it can be found that Data Bursts 6, 7, 8 and 9 of the data transmission interval 230 occupy two symbol intervals, which are assumed as 'n' and 'n+1', subchannels of the 'n' symbol interval are partially used and some subchannels are used in the next 'n+1' symbol interval from FIG. 2. If the data bursts are allocated in the one-dimensional form, Data Bursts 6 and 7 must be allocated to some subchannels of the 'n' symbol interval and Data Bursts 8 and 9 must be allocated to the remaining subchannels of the 'n' symbol interval.

A method for configuring MAP information for the two-dimensional data burst allocation in accordance with an embodiment of the present invention will be described.

Table 1 shows the format of a 'Compact DL-MAP IE' message used during a one-dimensional data burst allocation, Table 2 shows the format of a 'Compact DL-MAP IE' message used during a two-dimensional data burst allocation and Table 3 shows the format of a 'Compact UL-MAP IE' message used during a two-dimensional data burst allocation.

TABLE 1

| Syntax | Size | Notes |
| --- | --- | --- |
| Compact_DL-MAP_IE ( ) { | | |
| DL-MAP Type = 0 | 3 bits | |
| UL-MAP append | 1 bit | |
| RCID_IE | variable | |
| $N_{EP}$ code | 4 bits | code of encoder packet bits |
| $N_{SCH}$ code | 4 bits | code of allocated subchannels |
| H-ARQ_Control_IE | variable | |
| CQICH_Control_IE | variable | |
| if(UL-MAP append) { | | |
| $N_{EP}$ code for UL | 4 bits | |
| $N_{SCH}$ code for UL | 4 bits | |
| H-ARQ_Control_IE for UL | variable | |
| } | | |
| } | | |

TABLE 2

| Syntax | Size | Notes |
| --- | --- | --- |
| Compact_DL-MAP_IE for Zone based allocation { | | |
| DL-MAP Type =7 | 3 bits | |
| DL-MAP sub-type = 4 | 5 bits | Zone based H-ARQ Configuration |
| Length | 4 bits | |
| OFDMA Symbol offset | 7 bits | |
| Subchannel offset | 6 bits | |
| No. OFDMA Symbols | 6 bits | |
| No. Subchannels | 6 bits | |
| Boosting | 3 bits | |
| for (i=0;i<#of IE;i++ | | |
| Compact_DL-MAP_IE for Diversity | variable | |
| } | | |
| padding bits | variable | shall be set to 0 |
| } | | |

Next, Tables 1 and 2 will be compared and a result of the comparison will be described.

In the 'Compact_DL-MAP_IE' message for the one-dimensional data burst allocation as shown in Table 1, a combination of values of the '$N_{EP}$ code' and '$N_{SCH}$ code' fields can indicate the number of allocated subchannels and a scheme of coding and modulation. The BS starts the data burst allocation from a first subchannel of a first symbol interval and allocates a first data burst corresponding to the number of subchannels set by the combination of the values of the '$N_{EP}$ code' and '$N_{SCH}$ code' fields. The allocation end point of the first data burst becomes the allocation start point of the next second data burst. The one-dimensional data burst allocation method can reduce the overhead in a region of H-ARQ MAPs 222 and 223. However, an SS located in a handover region may be affected by interference from a neighbor cell in the one-dimensional data burst allocation method.

Table 2 shows the 'Compact DL-MAP_IE' message for two-dimensional data burst allocation in accordance with an embodiment of the present invention. The 3-bit 'DL-MAP Type' field indicates a type of DL-MAP. The 5-bit 'DL-MAP sub-type' field indicates a sub-type of DL-MAP. The 4-bit 'Length' field indicates a length of an IE. The 7-bit 'OFDMA Symbol offset' field indicates a symbol start position of an allocated two-dimensional region. The 6-bit 'Subchannel offset' field indicates a subchannel start position of an allocated two-dimensional region. The 6-bit 'No. OFDMA Symbols' field indicates the number of symbols allocated to the two-dimensional region. The 6-bit 'No. Subchannels' field indicates the number of subchannels allocated to the two-dimensional region. The 3-bit 'Boosting' field indicates whether subcarrier power has been amplified. The variable-length 'Compact DL-MAP_IE for Diversity' field is used to allocate data bursts to the two-dimensional region in one dimension. The 'Compact DL-MAP_IE for Diversity' field includes all the fields as shown in Table 1.

The fields used to designate a region for allocating two-dimensional bursts are the 'OFDMA Symbol offset', 'Subchannel offset', 'No. OFDMA Symbols', and 'No. Subchannels' fields. That is, a value of the 'OFDMA Symbol offset' field indicates a point of a symbol interval from which the data burst allocation starts in the data transmission interval 230 of FIG. 2. A value of the 'Subchannel offset' field indicates a subchannel point from which the data burst allocation starts in the data transmission interval 230. As described above, the BS designates the start point of a two-dimensional data burst allocation region using the 'OFDMA Symbol offset' and 'Subchannel offset' fields. When the number of symbols and the number of subchannels are set according to the values of the 'No. OFDMA Symbols' and 'No. Subchannels' fields, a total two-dimensional data burst allocation region is completely set.

The BS allocates data bursts to the completely set two-dimensional data burst allocation region according to the one-dimensional data burst allocation method.

The method for setting a two-dimensional data burst allocation region in a DL subframe and allocating data bursts to the set region in one dimension can be equally applied to the allocation method in a UL subframe.

Table 3 shows the format of the Compact_UL-MAP_IE message. Since the fields of the Compact_UL-MAP_IE message of Table 3 are very similar to those of the Compact_DL-MAP_IE message of Table 2, a description thereof is omitted.

TABLE 3

| Syntax | Size | Notes |
| --- | --- | --- |
| Compact_UL-MAP_IE for Zone based allocation { | | |
| UL-MAP Type =7 | 3 bits | |
| UL-MAP sub-type = 4 | 5 bits | Zone based H-ARQ Configuration |
| Length | 4 bits | |
| OFDMA Symbol offset | 7 bits | Offset from the start symbol of UL subframe |
| Subchannel offset | 6 bits | |
| No. OFDMA Symbols | 6 bits | |
| No. Subchannels | 6 bits | |
| for (i=0;I<#of IE;i++ | | |
| Compact_DL-MAP_IE for Diversity | variable | |
| } | | |
| padding bits | variable | shall be set to 0 |
| } | | |

As is apparent from the above description, the present invention can improve the data transmission efficiency by setting a specific region in two dimensions and allocating uplink (UL) and downlink (DL) data bursts to the set region in one dimension in a wireless communication system.

Although preferred embodiments of the present invention have been disclosed for illustrative purposes, those skilled in the art will appreciate that various modifications, additions and substitutions are possible without departing from the scope of the present invention. Therefore, the present invention is not limited to the above-described embodiments, but is defined by the following claims, along with their full scope of equivalents.

What is claimed is:

1. A method for allocating data bursts in a wireless communication system having a frame set by a symbol axis and a frequency axis, the frame including a first region in which a MAP message is transmitted and a second region to which the data bursts are to be allocated, the method comprising:
    designating at least one third region within the second region, the at least one third region being defined by symbol and frequency;
    sequentially allocating the data bursts to the third region starting at a first symbol in the third region in a frequency order; and
    transmitting the data bursts allocated to the third region, wherein the at least one third region is defined as one or more two-dimensional data regions based on a number of symbols and a number of subchannels.

2. The method of claim 1, wherein the second region comprises at least one region to which downlink or uplink data bursts are allocated.

3. The method of claim 1, wherein the MAP message comprises information for designating the third region.

4. The method of claim 3, wherein the MAP message comprises a hybrid automatic repeat request (H-ARQ) MAP message.

5. The method of claim 4, wherein the H-ARQ MAP message comprises:
- an orthogonal frequency division multiple access (OFDMA) symbol offset field for indicating a symbol point from which a corresponding data burst allocation starts;
- a subchannel offset field for indicating a subchannel point from which the corresponding data burst allocation starts;
- a Number of OFDMA symbols field for indicating a number of symbols to designate a symbol interval from a symbol start point; and
- a Number of subchannels field for indicating information about a frequency band size to designate a frequency band from a subchannel start point.

6. The method of claim 4, wherein the H-ARQ MAP message comprises at least one of an uplink H-ARQ information element (IE) message and a downlink H-ARQ IE message.

7. The method of claim 1, wherein the frequency band is set different from a frequency band used in a neighbor cell.

8. A system for allocating data bursts in a wireless communication system having a frame set by a symbol axis and a frequency axis, the frame including a first region in which a MAP message is transmitted and a second region to which the data bursts are to be allocated, the system comprising:
- a base station for, designating at least one third region within the second region, the at least one third region being defined by symbol and frequency, sequentially allocating the data bursts to the third region starting at a first symbol in the third region in frequency order, and transmitting the data bursts allocated to the third region,
- wherein the at least one third region is defined as one or more two-dimensional data regions based on a number of symbols and a number of subchannels.

9. The system of claim 8, wherein the base station allocates downlink or uplink data bursts to the second region.

10. The system of claim 8, wherein the MAP message comprises information for designating the third region and is transmitted in the first region.

11. The system of claim 10, wherein the MAP message comprises a hybrid automatic repeat request (H-ARQ) MAP message.

12. The system of claim 11, wherein the H-ARQ MAP message comprises:
- an orthogonal frequency division multiple access (OFDMA) symbol offset field for indicating a symbol point from which a corresponding data burst allocation starts;
- a subchannel offset field for indicating a subchannel point from which the corresponding data burst allocation starts;
- a Number of OFDMA symbols field for indicating a number of symbols to designate a symbol interval from a symbol start point; and
- a Number of subchannels field for indicating information about a frequency band size to designate a frequency band from a subchannel start point.

13. The system of claim 11, wherein the H-ARQ MAP message comprises at least one of an uplink H-ARQ information element message and a downlink H-ARQ information element message.

14. The system of claim 8, wherein the base station sets the frequency band different from a frequency band used in a neighbor cell.

15. The method of claim 1, wherein the length is determined by a combination of values of an $N_{EP}$ code and an $N_{SCH}$ code.

16. The method of claim 8, wherein the length is determined by a combination of values of an $N_{EP}$ code and an $N_{SCH}$ code.

17. A method for receiving data bursts in a wireless communication system having a frame set by a symbol axis and a frequency axis, the frame including a first region in which a MAP message is transmitted and a second region to which the data bursts are to be allocated, the method comprising:
- receiving the data bursts allocated in at least one third region within the second region,
- wherein the at least one third region is defined as one or more two-dimensional data regions based on a number of symbols and a number of subchannels, and
- wherein the data bursts are sequentially allocated to the third region starting at a first symbol in the third region in a frequency order.

18. The method of claim 17, wherein the MAP message comprises:
- an orthogonal frequency division multiple access (OFDMA) symbol offset field for indicating a symbol point from which a corresponding data burst allocation starts;
- a subchannel offset field for indicating a subchannel point from which the corresponding data burst allocation starts;
- a Number of OFDMA symbols field for indicating a number of symbols to designate a symbol interval from a symbol start point; and
- a Number of subchannels field for indicating information about a frequency band size to designate a frequency band from a subchannel start point.

19. A system for receiving data bursts in a wireless communication system having a frame set by a symbol axis and a frequency axis, the frame including a first region in which a MAP message is transmitted and a second region to which the data bursts are to be allocated, the system comprising:
- a mobile station for receiving the data bursts allocated in at least one third region within the second region,
- wherein the at least one third region is defined as one or more two-dimensional data regions based on a number of symbols and a number of subchannels, and
- wherein the data bursts are sequentially allocated to the third region starting at a first symbol in the third region in a frequency order.

20. The system of claim 19, wherein the MAP message comprises:
- an orthogonal frequency division multiple access (OFDMA) symbol offset field for indicating a symbol point from which a corresponding data burst allocation starts;
- a subchannel offset field for indicating a subchannel point from which the corresponding data burst allocation starts;
- a Number of OFDMA symbols field for indicating a number of symbols to designate a symbol interval from a symbol start point; and
- a Number of subchannels field for indicating information about a frequency band size to designate a frequency band from a subchannel start point.

* * * * *